Patented Aug. 23, 1938

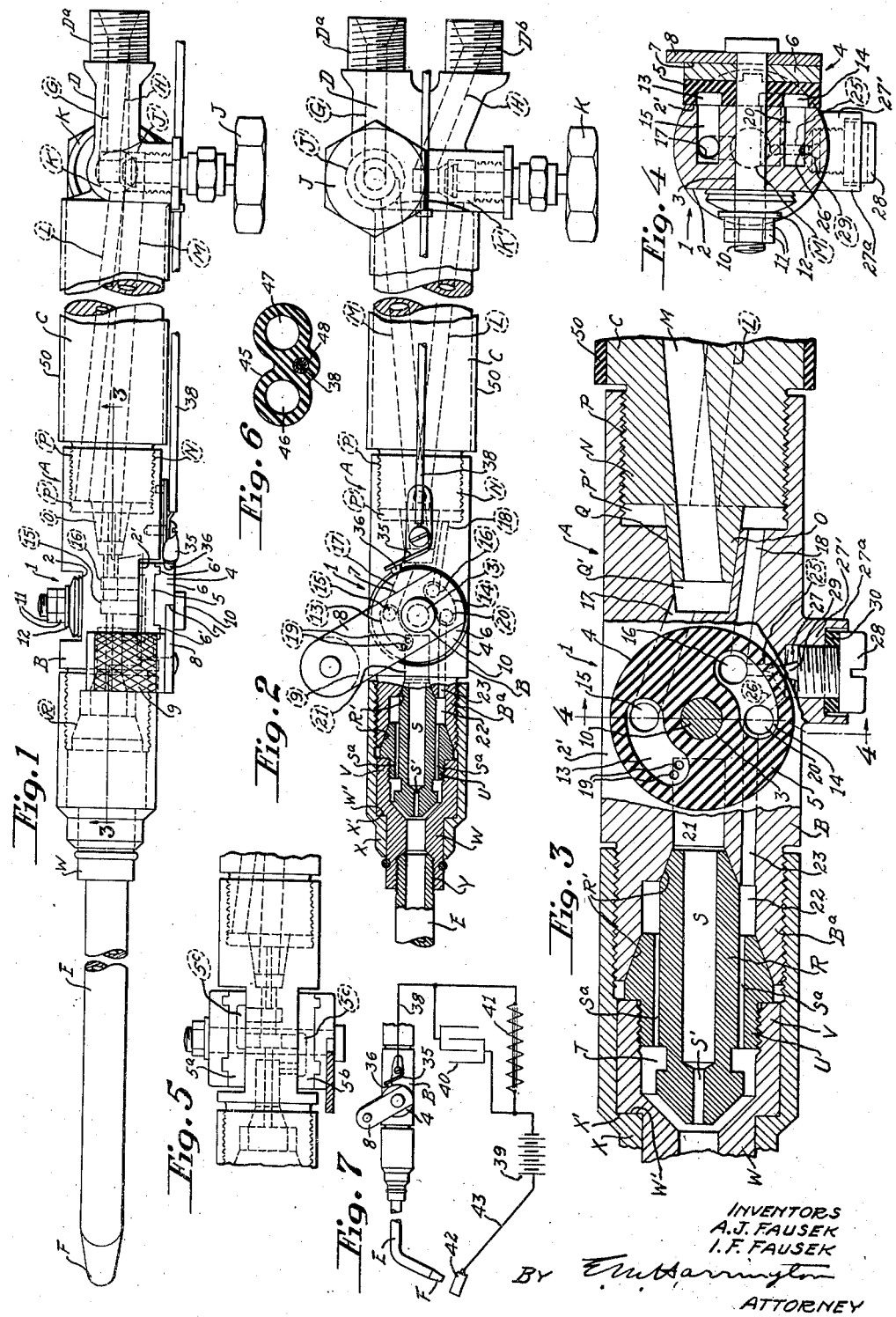

2,127,723

UNITED STATES PATENT OFFICE 2,127,723

TORCH

Arthur J. Fausek and Irwing F. Fausek, Clayton, Mo.

Application September 7, 1935, Serial No. 39,525

5 Claims. (Cl. 158—27.4)

This invention relates generally to torches, and more specifically to gas-burning welding and cutting torches, the predominant object of the invention being to provide a torch of this type with rotary cut-off means associated with the handle of the torch and operable in a manner to cut off the supply of fuel gas and oxygen to the nozzle of the torch when in the use of the improved torch it is desired to temporarily extinguish or diminish the flame at the nozzle of the torch.

Another object of the invention is to provide a torch which has cut-off means associated therewith, as described above, with electrical means for re-igniting the torch when the flame at the nozzle of the torch has been temporarily extinguished by operation of the cut-off means. In accordance with the present invention an electrical circuit is provided for producing sparks for re-igniting the torch, and this electrical circuit is made and broken by switch means associated with the cut-off means of the torch, said switch means being adapted to complete the electrical circuit when the cut-off means is in the open position and to interrupt said circuit when the cut-off means is in the closed position.

Fig. 1 is a plan view of a torch constructed in accordance with this invention with parts broken away to permit the torch to be illustrated on a larger scale.

Fig. 2 is a side elevation of the torch structure shown in Fig. 1 with parts thereof shown in section.

Fig. 3 is an enlarged, fragmentary, longitudinal section taken through the improved torch on line 3—3 of Fig. 1.

Fig. 4 is an enlarged section on line 4—4 of Fig. 3.

Fig. 5 illustrates a modified form of the invention.

Fig. 6 illustrates still another modified form of the invention.

Fig. 7 is a diagrammatical view illustrating the sparking circuit associated with the improved torch.

In the drawing, wherein are shown for the purpose of illustration, merely, several embodiments of the invention, A designates the improved torch generally. The torch A comprises a body portion B, a handle C, a tail piece D, and a discharge conductor E which leads from the body portion of the torch to the nozzle F thereof. The tail piece D of the torch is provided with screw-threaded extensions $D^a$ and $D^b$ which receive conductors (not shown) leading from sources of supply of oxygen and fuel gas, an oxygen port G and a fuel gas port H being formed in said tail piece which lead from said extensions $D^a$ and $D^b$ to the chambers J' and K' of the valves J and K which are operable to regulate the flow of oxygen and fuel gas through the torch. Leading forwardly of the handle C of the torch from the chambers of the valves J and K is a fuel gas port L and an oxygen port M, said handle being provided with a screw-threaded forward portion N at the forward face of which said fuel gas port L terminates, and said oxygen port M terminating at the outer face of a forwardly projected extension O formed on said screw-threaded forward portion N, as shown most clearly in Fig. 3.

The body portion B of the torch is provided with a screw-threaded cavity P into which the screw-threaded portion N of the torch handle is screwed, and said body portion is provided also with a cavity Q into which the extension O is extended (see Fig. 3). It will be noted that chambers P' and Q' are provided at the forward ends of the cavities P and Q with which the fuel gas port L and the oxygen port M communicate, the chamber P' being in communication with the fuel gas port L and the chamber Q' being in communication with the oxygen port M.

The body portion B is cut away at the point designated by the reference character 1 to provide flat faces 2 and 2' at opposite sides of said body portion, and an opening 3 is formed through the material of the body portion which is located between these flat faces (Figs. 3 and 4). Located at the flat face 2' is a valve head 4 which comprises a disk 5 formed of suitable material such, for instance, as hard rubber. The disk 5 is associated with a metallic disk 6 which is provided with radial depressions 6' in which extensions formed on the disk 5 are projected so as to secure said disks 5 and 6 together. Also at the opposite or outer face of said disk 6 a recess 7 is formed which receives a portion of a handle 8, said handle having a knurled operating element 9 which overhangs the body portion B of the torch as shown in Fig. 1. In order to secure the valve head 4 in place, a bolt 10 is extended through apertures formed through the disks 5 and 6, and through the handle 8, this bolt 10 being extended also through the opening 3 formed through the body portion of the torch. The bolt 10 extends beyond the flat face 2 of the body portion of the torch, and nuts 11 and a washer 12 are mounted on said extended portion of the bolt, and interposed between said washer and the adjacent flat face 2 is a pair of dished spring elements arranged under slight compression which tend to draw the inner face of the disk 5 in close contact with the flat face 2'.

The disk 5 at its inner face is provided with a pair of arcuate cavities 13 and 14 which are movable into and out of communication with a pair of chambers 15 and 16 formed transversely in the body portion of the torch (see Figs. 3 and 4), the chamber 15 being in communication with a port 17 which communicates also with the oxygen chamber Q', and the chamber 16 being in communication with a port 18 which also communicates with the fuel gas chamber P'. The body portion of the torch is provided with a pair of small oxygen ports 19 into and out of communication with which the arcuate cavity 13 of the disk 5 is movable, and likewise said torch body portion is provided with a transversely extended chamber 20 into and out of communication with which the arcuate cavity 14 of the disk 5 is movable. The small oxygen ports 19 communicate with a chamber 21 formed in the forward portion of the body portion B, while the chamber 20 is placed in communication with an annular chamber 22 by means of a port 23.

The mixing chamber of the torch A includes a core R shaped as illustrated most clearly in Fig. 3, which is provided with tapered faces R' which contact with correspondingly shaped faces formed within the forward part of the body portion of the torch, said core and the forward part of the body portion of the torch being provided with annular cavity portions which combine to produce the chamber 22 already referred to herein. The core R has formed centrally therethrough an oxygen port S which communicates with the chamber 21 at its rear end, and at the forward end of the core the port S is of reduced diameter, as indicated at S' in Figs. 2 and 3. Also, the core R is provided with a plurality of fuel gas ports S$^a$ which communicate at their inner ends with the annular chamber 22, and at their forward ends with an annular space T which surrounds the forward portion of the core. The core R is provided with a screw-threaded portion U which receives the internally screw-threaded rear portion V of a sleeve W, this sleeve being internally shaped so as to provide in combination with the forward part of the core R the annular space T heretofore mentioned. The sleeve W is provided with a shoulder W' which receives in contact therewith a corresponding shoulder X' formed within a nut X, said nut being adapted for screw-threaded engagement with the screw-threaded forward portion B$^a$ of the body portion of the torch, as shown in Figs. 2 and 3, so that the tapered faces R' of the core R may be drawn into close contact with the correspondingly shaped faces located within the forward part of the body portion B of the torch. The sleeve W is internally screw-threaded at its forward end, as indicated at Y in Fig. 2, and the discharge conductor E is screwed into said forward end of said sleeve as shown in the view mentioned.

In the operation of the invention as thus far described, oxygen and fuel gas pass from their sources of supply through the ports G and H to the valve chambers of the valves J and K, these valves having been set to provide the desired flow of oxygen and fuel gas through the torch. From the chambers of the valves J and K the oxygen and fuel gas pass through the ports M and L to the chambers Q' and P', and from said chambers Q' and P' the oxygen passes through the ports 17 and 18 to the transverse chambers 15 and 16. If the valve head 4 of the cut-off means is in the open position the oxygen passes from the chamber 15 through the arcuate cavity 13 of the disk 5 to the small ports 19, while the fuel gas passes from the chamber 16 through the arcuate cavity 14 to the chamber 20. From the small ports 19 the oxygen passes into the chamber 21 and through the ports S and S' to the forward end of the core R of the mixing chamber, the fuel gas at the same time passing from the chamber 20 through the port 23 to the annular chamber 22, and through the ports S$^a$ to the space T at the forward end of the core R. The oxygen and fuel gas are commingled at the forward end of the core R to produce a combustible mixture which passes through the discharge conductor E to the discharge orifice of the nozzle F, where said combustible mixture is burned.

When in the use of the improved torch disclosed herein it is desired to temporarily cut off the flow of oxygen and fuel gas to the nozzle of the torch, the operator engages the knurled element 9 of the handle with this thumb and moves the handle 8 rearwardly (the cut-off means being shown in the open position in the drawing). This will cause the arcuate cavities 13 and 14 of the disk 5 to move away from the fuel gas chamber 16 and the small oxygen ports 19, whereby said chamber and said small ports will be closed by unrelieved portions of the inner face of the disk 5, and flow of oxygen and fuel gas to the nozzle of the torch will be interrupted. When the operator again wishes oxygen and fuel gas to flow to the nozzle of the torch, he moves the handle 8 forwardly, thereby again locating the arcuate cavities 13 and 14 so that communication is made between the oxygen chamber 15 and the small ports 19 and between the fuel gas chambers 16 and 20.

If desired a by-pass for fuel gas may be provided between the chambers 16 and 20, so that when the flow of fuel gas is interrupted when the cut-off means is in the closed position a small amount of fuel gas may be permitted to flow to the discharge orifice of the nozzle to provide a pilot flame. This arrangement is shown most clearly in Figs. 3 and 4, where ports 25 and 26 lead respectively from the chambers 16 and 20 to a valve chamber 27 in a boss 27' formed on the body portion of the torch. The valve chamber 27 is internally screw-threaded, and it receives a screw-threaded element 28 which is provided with a needle valve 29 at its inner end. The needle valve 29 is extended into the port 25, and by screwing the needle valve into and out of the end of said port 25 the flow of fuel gas through said port and consequently to the discharge orifice of the nozzle of the torch may be regulated. A gasket 30 formed of soft rubber or other suitable material is interposed between the head of the screw-threaded element 28 and a face within the boss 27', said boss including an annular flange 27$^a$ which surrounds said gasket and maintains it in proper position.

Also, instead of providing a pilot flame at the discharge orifice of the nozzle of the torch we contemplate in some instances to provide electrical sparking means for re-igniting the combustible mixture when it has been cut off through the operation of the cut-off means, or when the torch is being initially started. The sparking arrangement referred to comprises a terminal member 35 (Fig. 2) which is secured to the body portion of the torch. The terminal member 35 is formed of more or less resilient material, and said terminal member is engaged by a contact element 36 which is carried by the disk 6 of the head 4 of the cut-off means of the torch. The terminal member 35 has electrically connected to it an electrical conductor 38 through which current flows to said terminal member from a suitable source of energy, such as the battery 39 shown in Fig. 7, the electrical conductor having associated with it a condenser 40 and a choke coil 41 to provide the required energy. The sparking means includes also a block of sparking metal 42 which is arranged in electrical connection with the battery through the instrumentality of a conductor 43, this sparking metal preferably being the material known as "ferro cerium".

The contact element 36 is so positioned on the disk 6 of the cut-off means of the torch that it will contact with the terminal member 35 only when the cut-off means is in the open position. Therefore when the flow of oxygen and fuel gas has been interrupted and the operator again desires to ignite the combustible mixture at the discharge orifice of the nozzle of the torch, he will move the handle 8 forwardly as already explained herein. This causes the contact element 36, which is electrically grounded to the torch, to move into electrical contact with the terminal member 35. The operator then rubs the discharge end of the nozzle of the torch against the block of sparking metal 42 which is fixed in a convenient location, to a work bench, for instance, and sparks are thereby produced which ignite the combustible mixture issuing from the discharge orifice of the nozzle. It is important to note that the contact element 36 is in electrical contact with the terminal member 35 only when the cut-off means is in the open position, and that the same movement which opens the cut-off means makes electrical contact between said contact element 36 and said terminal member 35.

If desired, the flexible conductors which conduct oxygen and fuel gas from the sources of supply of these gases to the tailpiece D of the torch may be made as shown in Fig. 6. In this view 45 designates a unitary structure of rubber or other suitable material which is provided with two passageways 46 and 47, one for oxygen and the other for fuel gas. The unitary structure 45 is provided also with another opening 48 through which the electrical conductor 38 already referred to herein may be extended. By this arrangement the electrical conductor 38 is confined so that no loose wire is present which might interfere with free use of the torch.

In Figs. 1 to 4, inclusive, the cut-off means includes a disk 5 located at one side of the torch which is provided with a pair of arcuate cavities 13 and 14, one for passage of oxygen and the other for passage of fuel gas. In Fig. 5 we illustrate a modified form of this construction in accordance with which a pair of disks 5ª and 5ᵇ are employed which are located at opposite sides of the torch. In this form of the invention each of the disks 5ª and 5ᵇ is provided with one arcuate cavity 5ᶜ which serves as a passageway for either oxygen or fuel gas, as the case may be.

In the case of a torch provided with a fuel gas pilot flame as heretofore explained, the cut-off means is so arranged that the flow of oxygen is cut off before the flow of fuel gas is cut off, and also when the cut-off means is moved to an open position the flow of fuel gas is established slightly in advance of the establishment of the flow of oxygen. This arrangement prevents the slow burning pilot frame from being blown out by a sudden flow of oxygen.

If desired, the handle portion of the torch may be embraced by a tubular element 50 of rubber or other suitable material. This tubular element protects the operator's hand from heat and electricity, and by providing tubular elements of different thicknesses handles of different diameters may be provided.

We claim:

1. A torch of the class described provided with passageways formed therethrough for passage of oxygen and fuel gas to the nozzle of the torch, cut-off means carried by the torch for temporarily interrupting passage of oxygen and fuel gas through said passageways to the nozzle of the torch, and electrical means associated with the torch for re-igniting said torch after the flame thereof has been extinguished by operation of the cut-off means, operation of said re-igniting means being controlled by actuation of said cut-off means and said electrical means including an electrical circuit which is grounded to the torch and which includes a block of metal against which the nozzle of the torch may be rubbed to produce sparks.

2. A torch of the class described provided with passageways formed therethrough for passage of oxygen and fuel gas to the nozzle of the torch, cut-off means carried by the torch for temporarily interrupting passage of oxygen and fuel gas through said passageways to the nozzle of the torch, electrical means associated with the torch for re-igniting said torch after the flame thereof has been extinguished by operation of the cut-off means, said electrical means including an electrical circuit which is grounded to the torch and which includes a block of metal against which the nozzle of the torch may be rubbed to produce sparks, and switch means operated by actuation of said cut-off means for controlling passage of electrical energy through said circuit.

3. A torch of the class described provided with passageways formed therethrough for passage of oxygen and fuel gas to the nozzle of the torch, cut-off means carried by the torch for temporarily interrupting passage of oxygen and fuel gas through said passageways to the nozzle of the torch, electrical means associated with the torch for re-igniting said torch after the flame thereof has been extinguished by operation of the cut-off means, said electrical means including an electrical circuit which is grounded to the torch and which includes a block of metal against which the nozzle of the torch may be rubbed to produce sparks, and switch means for controlling passage of electrical energy through said circuit, said switch means including a terminal member fixed to the torch body and a contact element movable with a part of said cut-off means into and out of contact with said terminal member.

4. A torch of the class described provided with passageways formed therethrough for passage of oxygen and fuel gas to the nozzle of the torch, cut-off means carried by the torch for temporarily interrupting passage of oxygen and fuel gas through said passageways to the nozzle of the torch, electrical means associated with the torch for re-igniting said torch after the flame thereof has been extinguished by operation of the cut-off means, and conducting means leading from sources of supply of oxygen and fuel gas to said torch, said conducting means comprising a unitary structure through which separate passageways for oxygen and fuel gas are formed and being provided with an opening extended longitudinally thereof through which a wire of said electrical re-igniting means is extended.

5. A torch of the class described provided with passageways formed therethrough for passage of oxygen and fuel gas to the nozzle of the torch, cut-off means carried by the torch for temporarily interrupting passage of oxygen and fuel gas through said passageways to the nozzle of the torch, and electrical means associated with the torch for re-igniting said torch after the flame thereof has been extinguished by operation of the cut-off means, operation of said electrical means being controlled by actuation of said cut-off means and said electrical means including an electrical circuit which is grounded to the torch and which includes as a part thereof an element at which electric sparks are produced for re-igniting the torch.

ARTHUR J. FAUSEK.
IRWING F. FAUSEK.